Patented Feb. 7, 1933

1,896,145

UNITED STATES PATENT OFFICE

CYRIL J. STAUD AND CHARLES S. WEBBER, OF ROCHESTER, NEW YORK, ASSIGNORS TO EASTMAN KODAK COMPANY, OF ROCHESTER, NEW YORK, A CORPORATION OF NEW YORK

CELLULOSE ACETATE COMPOSITION

No Drawing.   Application filed May 17, 1929. Serial No. 363,986.

This invention relates to cellulose acetate, useful in the production of films and other objects having a high degree of flexibility, and to products made therefrom.

In the photographic industry and particularly in the manufacture of motion picture film, it is desirable that the film have a flexibility such that it may be used a great many times without appreciable embrittlement. In the lacquer industry also the flexibility of the lacquer film is of great importance.

Cellulose acetate found no use in the early history of the photographic and lacquer arts primarily because films resulting from the evaporation of a solution of cellulose acetate were very brittle. These cellulose acetates were made by digesting cellulose at various temperatures in an acetic acid solution containing acetic anhydride and a catalyst. Under the most favorable conditions a triacetyl cellulose was obtained which was soluble in chloroform. After the work of Miles, who by hydrolyzing the cellulose acetate obtained a cellulose acetate soluble in acetone, cellulose acetate has been used in increasing amounts in the photographic, lacquer and other fields due to the fact that the product which he discovered had sufficient flexibility to be of utility.

By analysis the chloroform soluble triacetyl cellulose contains approximately 44.8 per cent acetyl while the acetone soluble variety contains from 37 to 42 per cent acetyl. By hydrolyzing cellulose acetate to a point at which it contained less than 37 per cent acetyl, it has been thought that the resulting product was so degraded that it could be used for no purpose whatsoever. Prior to our invention, therefore, cellulose acetate has ordinarily not been hydrolyzed below 37 per cent acetyl and if it be, by accident or otherwise, hydrolyzed below this percentage it has been considered as waste material.

One of the objects of the present invention is the utilization of cellulose acetate which has been hydrolyzed to a point at which the acetyl content of the acetate is less than 37% and by the use of a suitable solvent to produce a film having a high degree of flexibility. Other objects will more fully hereinafter appear.

We have found that cellulose acetates which have been hydrolyzed for instance, to 30 to 35 per cent acetyl and which are soluble in hot 75 per cent aqueous alcohol may be dissolved in a mixture consisting of ethylene chloride and a lower monohydroxy aliphatic alcohol containing from one to five carbon atoms. This solvent mixture may be used with varying proportions of the ethylene chloride or the alcohol. We have found, as will be brought out hereafter, that a composition containing about 75 per cent of the ethylene chloride and 25 per cent of the alcohol is suitable for producing a high degree of flexibility.

In using this solvent mixture we have found that one containing 60 per cent alcohol and 40 per cent ethylene chloride gives a fair degree of flexibility, on increasing the ethylene chloride content to 50 per cent a slight decrease in the flexibility is attained, but by an increase in the ethylene chloride content to 75 per cent a gradual increase of the flexibility to a very high value results. Even at the minimum point of flexibility resulting from the use of this mixture, which is reached at 50 per cent ethylene chloride and 50 per cent alcohol, the flexibility is markedly greater than that obtained from the acetone soluble cellulose acetate.

Any of the well known methods for acetylating the cellulose may be employed. For instance, cellulose triacetate may be produced in accordance with the method described in U. S. Patent 1,683,347, H. LeB. Gray and C. J. Staud, Sept. 4, 1928. This cellulose triacetate may be hydrolyzed in accordance with the process described in U. S. Patent 1,634,986, Farrow, July 5, 1927, but instead of stopping the hydrolysis at acetone solubility it is continued until a cellulose acetate containing 33 to 34 per cent acetyl is produced. On dissolving 100 parts of this material in 400 parts of a mixture consisting of 75 per cent ethylene chloride and 25 per cent methanol by volume a transparent, colorless solution results. If this solution be coated on any of the well-known film forming surfaces a film results which is equal in every way, such as, transparency, brillance, and freedom from grain and haze to a film produced from acetone soluble cellulose acetate, containing 37 to 42 per cent acetyl and coated from the acetone solution. This film, however, after thoroughly drying and curing, has a flexibility when tested on a modified Schopper testing machine of from 300 to 400 per cent higher than that shown by films produced from dopes containing cellulose acetate dissolved in acetone. If films of cellulose acetate prepared by the method herein described and films prepared from acetone soluble cellulose acetate be conditioned at 42 per cent relative humidity, the film containing 33 to 34 per cent acetyl and coated from ethylene chloride-methanol solution will give on the Schopper testing machine 17 folds while a film of equal thickness formed from cellulose acetate containing 39.5 per cent acetyl (an acetone soluble cellulose acetate) gives only 4½ folds.

The slight amount of residual solvent remaining in our improved film is not responsible, it is thought, for the high degree of flexibility of the film coated from 75-25 ethylene chloride-methanol, nor does the halogenated hydrocarbon residuum decompose on heating to produce materials which are deleterious to the high flexibility or other property of the film. The following example illustrates the permanency of the flexibility under these conditions.

Two portions of the same films upon which the above determination of flexibility had been made were subjected to a temperature of 100° C. for 48 hours and then re-conditioned at 42 per cent relative humidity, that is, permitted to come to equilibrium with air containing 42 per cent of the saturation value of water vapor at the temperature at which the experiments were made, namely 75° F. The film made from cellulose acetate containing 33 to 34 per cent acetyl and coated from 75-25 ethylene chloride-methanol gave 20 folds while the film from cellulose acetate containing 39.5 per cent acetyl and coated from acetone solution gave but 4½ folds, both films being of the same thickness.

It will, therefore, be seen that films formed from dopes made with our solvent mixture and having an acetyl content in the neighborhood of 33 to 34 per cent have a high degree of flexibility which could not be expected, especially, when it has heretofore been considered that cellulose acetates that were hydrolyzed to such an extent were so greatly degraded that they were not suitable for any commercial uses. As acetone proved to be a commercial solvent of greater value for partially hydrolyzed cellulose acetate than chloroform, it is believed that our even more inexpensive solvent of ethylene chloride and alcohol will prove even more economical and useful.

The well known plasticizers, such for example as monochloronaphthalene, triphenyl phosphate, tricresyl phosphate, etc., may be added to these solutions to enhance plasticity or increase the non-inflammable characteristics. Non-solvents also may be added to the solutions but not in such amounts as to cause precipitation of the cellulose acetate therefrom.

Various changes may be made in the method of carrying out our invention without departing from the spirit or scope thereof. For instance, as hereinbefore indicated a solvent consisting of approximately equal volumes of ethylene chloride and methanol may be employed with satisfactory results although a higher degree of flexibility in the film is obtained as the ethylene chloride content of the solvent is increased up to approximately three parts of the chloride to one of the methanol. Also other aliphatic monohydric alcohols having from one to five carbon atoms, such, for instance, as ethanol may be employed.

Having thus described our invention, what we claim as new and desire to secure by Letters Patent is:

1. A composition of matter comprising cellulose acetate having an acetyl content of from substantially 30 per cent to 35 per cent, ethylene chloride, and a lower monohydroxy aliphatic alcohol having less than 6 carbon atoms.

2. A composition of matter comprising cellulose acetate having an acetyl content of from substantially 30 per cent to 35 per cent, ethylene chloride and methanol.

3. A composition of matter comprising cellulose acetate having an acetyl content of from substantially 30 per cent to 35 per cent, ethylene chloride, a lower monohydroxy aliphatic alcohol having less than 6 carbon atoms and a substance which enhances the plasticity of the cellulose acetate.

4. A composition of matter comprising cellulose acetate having an acetyl content of from substantially 30 per cent to 35 per cent in a mixed solvent comprising approximately 75 per cent ethylene chloride and 25 per cent of a monohydroxy aliphatic alcohol having less than 6 carbon atoms.

5. A composition of matter comprising 100 parts of cellulose acetate having an acetyl content of from approximately 30 per cent to 35 per cent dissolved in 400 parts of a mixed solvent comprising substantially 300 parts of ethylene chloride and 100 parts of methanol.

6. A sheet of high flexibility which comprises deposited or flowed cellulose acetate having an acetyl content of from substantially 30 per cent to 35 per cent, the sheet being deposited or flowed from a dope of the cellulose acetate dissolved in ethylene chloride and a monohydroxy aliphatic alcohol having less than 6 carbon atoms.

7. An extended body of cellulose acetate having great length relative to its width and thickness of high flexibility having an acetyl content of substantially 30 to 35 per cent, which is formed from a dope of the cellulose acetate dissolved in ethylene chloride and a monohydroxy aliphatic alcohol composed of one to five carbon atoms.

Signed at Rochester, New York, this 14th day of May, 1929.

CYRIL J. STAUD.
CHARLES S. WEBBER.